United States Patent Office
3,441,757
Patented Apr. 29, 1969

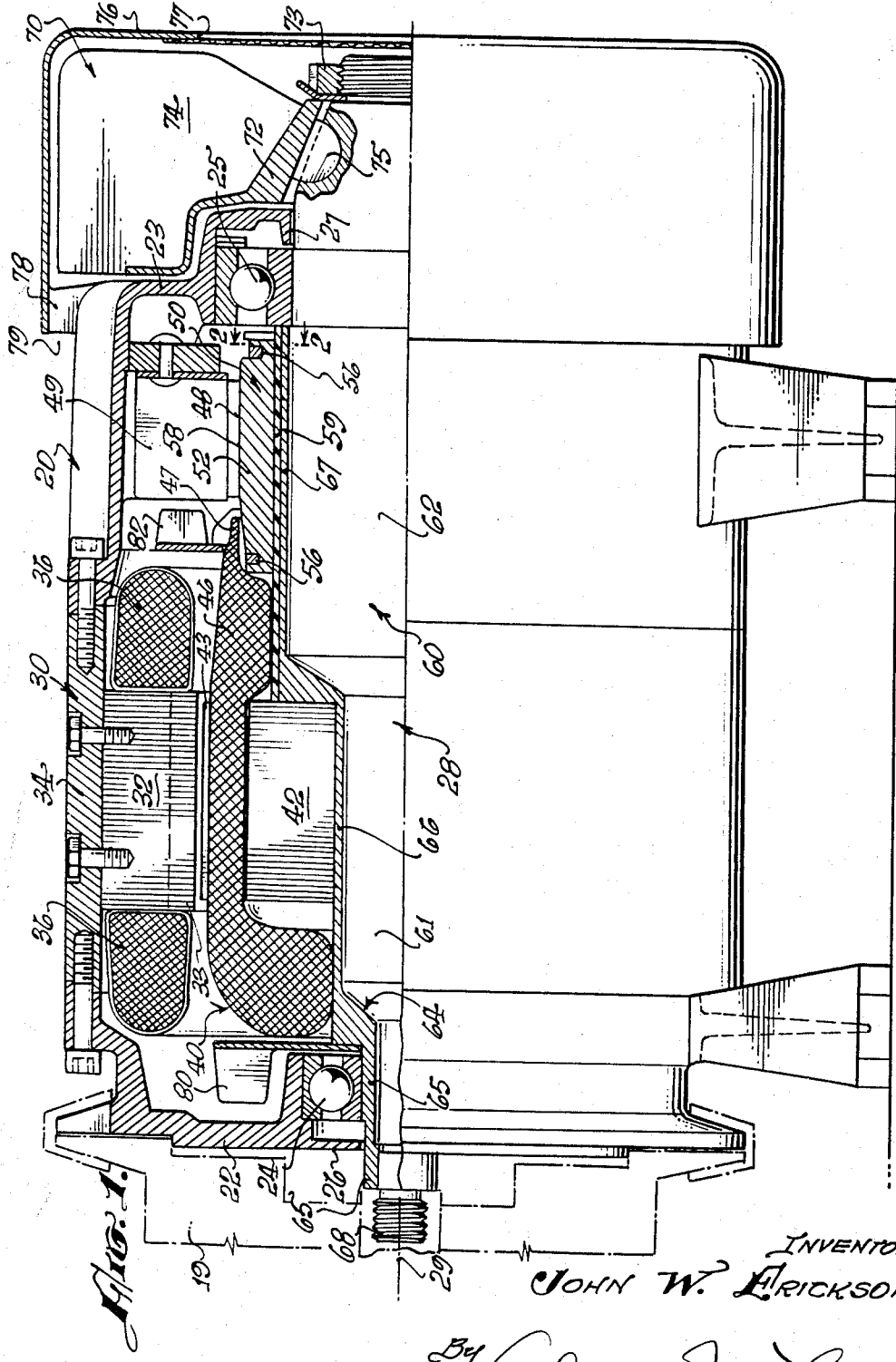

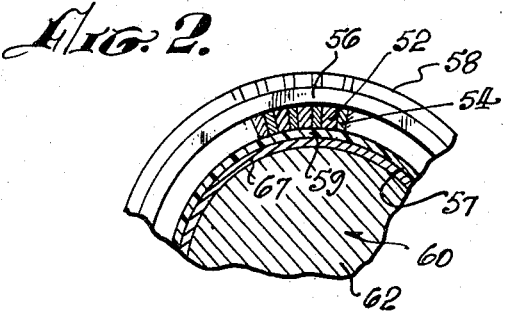
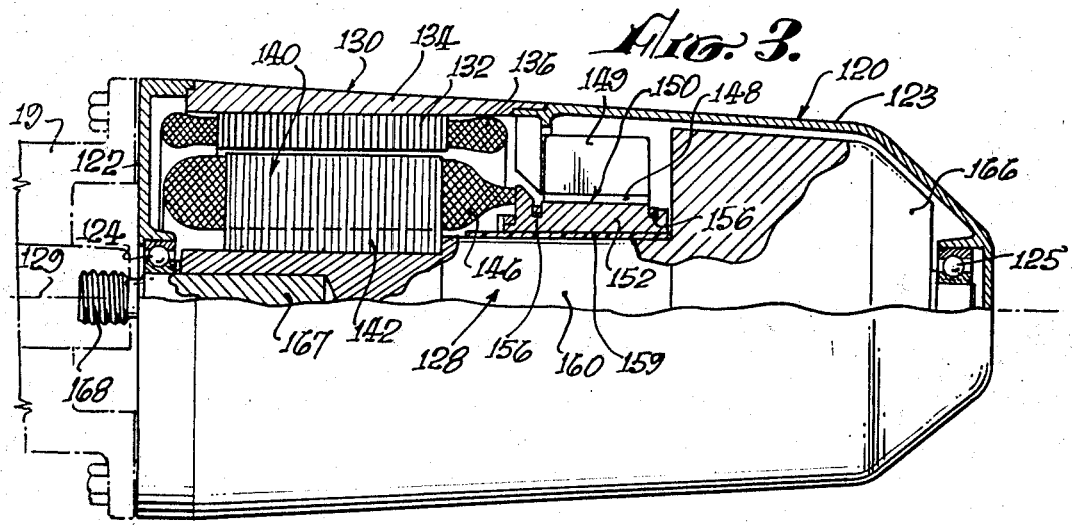

3,441,757
COOLING OF DYNAMOELECTRIC MACHINES
John W. Erickson, Huntington Beach, Calif., assignor to Preco, Inc., Los Angeles, Calif., a corporation of California
Filed Aug. 7, 1967, Ser. No. 658,841
Int. Cl. H02h 9/06, 9/22
U.S. Cl. 310—62                               11 Claims

ABSTRACT OF THE DISCLOSURE

Heat generated in the rotor of a dynamoelectric machine, or at the commutator surface when a commutator is used, is transferred out of the machine housing by axial conduction within the shaft. For that purpose all or a large portion of the shaft cross-section is formed of a metal such as aluminum or copper having high heat conductivity. The invention is especially useful in machines having a flameproof housing.

Alternatively, especially in a machine having a short duty cycle, rotor heat may be transferred by conduction along the shaft to a body capable of absorbing a large fraction of the heat developed during a single cycle. That form of the invention is especially useful when cooling air is not available.

To facilitate conduction of heat from the commutator surface to the conductive shaft, the commutator segments are preferably separated from the shaft only by an insulating layer. That is accomplished by binding the segments together typically with glass roving impregnated with synthetic resinous material.

---

This invention relates to dynamoelectric machines such as motors and generators, and concerns more especially improved cooling provisions for such machines.

Fully effective cooling of dynamoelectric machines by air circulation is considerably complicated when the electrical windings of the machines must be fully enclosed by a housing structure capable of resisting internal explosion preventing propagation of flame outside the housing and excluding foreign substances such as salt spray. Heat developed in the stator winding of such a machine can be conducted with good effciency to the wall of such a housing, and removed therefrom by external air circulation. However, appreciable heat is also developed in the rotor, and in machines having a commutator a major proportion of total heat is often developed at the commutator working surface. Only a portion of such heat can be effectively transferred to the exterior walls by rapid air circulation within the the enclosure and then removed by exterior air circulation, due to such factors as the limited area of the multiple air-metal interfaces that can be provided without sacrificing compactness of the machine.

Those and other difficulties in previous machines are avoided, in accordance with the present invention, by increased use of heat conduction through the rotor shaft of the machine. For that purpose the usual steel shaft is replaced by a shaft constructed largely or wholly of a metal of high heat conductivity, such as copper or aluminum. Such metal preferably occupies a predominant portion of the cross-section of the shaft throughout that portion of its axial length in which free heat flow is desired. Where such metal does not provide adequate structural properties, I have found that the conductive core of the shaft can be enclosed by a shell of structural material such as steel without seriously reducing the overall cooling effectiveness. Heat is removed from the shaft core through at least one end portion, which typically projects beyond the flame-proofing housing.

In one form of the invention, that projecting end portion of the shaft core carries a fan, mounted in close thermal conductive relation to the shaft and preferably formed with fan blades integrally formed on the hub and of sufficiently large cross section to conduct heat radially from the fan hub and transfer it efficiently to the air passing over the fan. That air is preferably caused to pass also over the exterior of the flame-proof housing, cooling that housing and the machine stator.

In another form of the invention, which is specially adapted for machines having a short duty cycle, a structure having high heat capacity is mounted directly on the heat conductive shaft body. Such a structure may comprise a mass of aluminum, for example, large enough to absorb the heat produced during one cycle of machine operation without excessive increase of temperature. The effectiveness of such a heat sink is greatly increased by the described shaft structure, which conducts heat from its source within the machine to the heat sink with remarkable efficiency. When the heat sink is mounted inside the machine housing, the latter can be fully enclosed.

The metal of high heat conductivity employed for the body of the rotor shaft, in accordance with the present invention, is typically either aluminum or copper, those terms being employed in the sense that includes ordinary alloys consisting primarily of those metals. The gain in heat conductivity obtained by employing such metals, as compared with ordinary structural steel, approaches an order of magnitude. The thermal conductivity of steel is approximately 26 B.t.u. transmitted per hour through a plate one foot in thickness across an area of one square foot when the temperature difference is one degree Fahrenheit. The corresponding conductivity for aluminum is about 124, and that for copper about 215, the exact values depending somewhat on the particular alloy used. For purposes of the present specification and claims the term "high heat conductivity" is intended to imply a value of at least about 100, in the above defined units.

A full understanding of the invention and of its further objects and advantages will be had from the following description of certain illustrative manners in which it may be carried out. The particulars of that description, and of the accompanying drawings which form a part of it, are intended only as illustration and not as a limitation upon the scope of the invention, which is defined in the appended claims.

In the figures:

FIG. 1 is an axial section representing an illustrative direct current motor in accordance with the invention;

FIG. 2 is a fragmentary section on line 2—2 of FIG. 1;

FIG. 3 is an axial section representing a further embodiment of the invention.

In the illustrative direct current motor of FIGS. 1 and 2 the main motor housing 20 is generally cylindrical with end walls 22 and 23. The rotor shaft 28 is journaled on the axis 29 by the bearings 24 and 25, which are mounted on the respective housing end walls. The shaft projects from housing 20 through the flame and explosion protective sealing formation 27 immediately adjacent shaft bearing 25. The drive end of shaft 65 projects through the opening 26, which is covered and enclosed by the driven equipment as shown by dashed lines at 19. Except for those openings, housing 20 is completely closed.

The stator assembly 30 comprises the usual stack of laminations 32, fixedly mounted coaxially in the magnetic tube 34, which forms a section of housing 20. Laminations 32 are shaped to form the field poles 33 and are slotted to receive the field windings 36, to which electrical connections are made in conventional fashion. The laminations preferably fit closely in tube 34, both to reduce magnetic losses and to provide effective conduction of heat developed in windings 36 and laminations 32 to the outer surface of the housing. The rotor assembly 40 comprises the laminations 42, which are slotted to form the rotor poles 43 and to receive the rotor windings 46. Those windings are electrically connected at 47 to respective segments of the commutator 50, which is engaged by the usual brushes 48, mounted in the brush holders 49.

The commutator 50 is constructed and mounted in a manner particularly suited to the requirements of the present invention. The copper commutator bars or segments 52 are of radially tapered section, as shown best in FIG. 2, and are assembled with the intervening layers 54 of insulating material to form the usual annular configuration. That assembly is bound together into a rigid and self-supporting unit by bindings 56 which are received in circumferential channels formed by suitable notches near the ends of the commutator bars. The bindings typically comprise ribbons of fiber glass impregnated during assembly with polymerizable synthetic resin of suitable type. They are wound into place under tension while the assembled commutator bars 52 and insulating layers 54 are subjected to radially inward pressure by a suitable fixture, typically comprising external compressible rings. After assembly the resin of the windings is cured at elevated temperature. The interior surface 57 of the commutator annulus is then machined to accurate cylindrical form, which may be slightly conically tapered if desired. The commutator annulus is then pressed onto the rotor shaft over the thin layer of insulating material, indicated at 59. That insulating layer typically comprises a glass-phenolic composition similar to that of the bindings, which is applied to the shaft, cured, and then machined to the appropriate dimensions. After assembly of the commutator on the rotor shaft, the commutator working surface 58 is machined in the usual way.

In accordance with the present invention, rotor shaft 28 comprises in large part a continuous and preferably unitary body 60 of a metal, such as copper or aluminum, having high heat conductivity. Body 60 occupies a predominant portion of the cross-section of the shaft over most of its axial length. That body projects axially from one end of housing 20, where it is thermally coupled to means outside the housing for removing heat from it. Heat conductive body 60 may be partially or wholly enclosed in a tube of structural material such as steel, which may thus form the active surface of the shaft, directly carrying and defining the bearings, the rotor assembly and the commutator.

In the present embodiment, such a structural shaft component is shown at 64, comprising a tube section 65 of relatively small diameter, a section 66 of larger diameter carrying rotor assembly 40, and a section 67 of still larger diameter carrying commutator 50. Section 65 carries the inner race of shaft bearing 23 and projects through an axial opening in housing end wall 22 where it is accessible for splined connection to the shaft 68 of a machine to be driven by the motor. Shaft tube sections 66 and 67 form an outer casing for a predominant portion of body 60, to which they may be assembled by a press fit. The central apertures in rotor laminations 42 preferably fit sleeve 66 closely, providing effective heat conductivity through the sleeve to body 60. The diameter of section 61 of that body is selected to conduct away in an axial direction with acceptable temperature drop the heat developed in the rotor laminations and a major fraction of that developed in rotor windings 46.

The section 62 of conductive body 60 is of appreciably larger diameter than section 61. Heat from the commutator, which is typically the source of a major fraction of all the heat developed by a direct current motor or generator, is conducted from the highly conductive copper commutator segments to the conductive shaft body 60 across only the thin layer of insulating material 59 and the thin steel shell 67. Since the radial thickness of layer 57 may be small, typically of the order of ten mils, and since the cross-section offered by it and sleeve 67 to the heat flow is large, particularly in view of the relatively large diameter of shaft body section 62, the temperature drop incurred between commutator bars 52 and body section 62 is found to be of little consequence. For all practical purposes, shaft body 60 is as effective in removing heat from the commutator segment as if it were constructed integrally with them. The conductivity can be further increased, if desired, by omitting steel shell 67 and form-insulative layer 57 directly on the surface of body 60.

Heat absorbed by body 60 from rotor 40 and from commutator 50 is conducted axially to the right, as seen in FIG. 1, through shaft bearing 25 and flame seal 27 to the exterior of housing 20. There the heat is removed from the shaft body in the present embodiment by conduction into the hub 72 of the fan 70, which is mounted in direct thermal contact with the outer end portion of body 60. The inner diameter of hub 72 is preferably large, and the interface between hub and shaft body may be conical, as shown, thereby increasing the inlet flow area of the fan. The hub is tightly bound to the shaft body by the retaining nut 73, and is rotatively locked by the key 75. The blades 74 of fan 70 are preferably integral with the hub, the whole being formed of a metal having high heat conductivity, so that heat entering the hub is readily conducted radially outward into the blades and dispersed from their large surface area into the air passing over them.

Fan 70 is enclosed by the shroud 76, mounted on the housing by means of the studs 78. The screened axial opening 77 in shroud 76 admits air to the fan, and the outlet airstream from the fan is directed by the annular orifice 79 along the outer cylindrical surface of housing 20, cooling that surface and removing heat conducted from stator 30. Shroud 76 may extend in radially spaced relation along any desired portion of the housing, with or without interposed cooling fins. However, even without such extension the directed airstream from orifice 79 tends to adhere effectively to the housing surface by virtue of the Coanda effect. Heat transfer from sources within the housing to the housing surface may be hastened in conventional manner by providing internal fans. For example, the fan 80 is mounted on shaft 28 near bearing 24, and the fan 82 is mounted adjacent the brush holders 49, with suitable apertures in the fan structure to facilitate connection of the rotor windings 46 to commutator bars 52.

With cooling structure of the described type, it has been found possible to design a direct current motor having a diameter of only about 5½ inches and a length of about 9½ inches that will deliver 6 horsepower on a continuous basis under normal ambient temperature while maintaining all internal temperatures within the range of 220° F. rise. It is estimated that approximately 60% of all the heat developed within housing 20 is removed by conduction axially along shaft body 60 to fan 70. The weight of body 60 is quite moderate and its volume is concentrated largely in space that is normally unused. The economy of the described heat transfer structure, as compared to complex liquid circulating systems for example, is obvious.

FIG. 3 represnts somewhat schematically a direct cur- motor having a heat absorbing system that is particularly useful under conditions such as very high altitude where cooling air is not available. The design is also highly effective under normal conditions for producing intense bursts of power for short time intervals. The generally cylindrical housing 120 includes the stator magnetic tube 134, the end wall 122 and the end portion 123. The rotor shaft 128 is journaled on the bearings 124 and 125. The stator assembly 130 includes the laminations 132 and windings 136. The rotor assembly 140 comprises the usual laminations 142 and windings 146, the latter being connected to commutator bars 152 of the commutator 150. The commutator is preferably constructed and mounted in the manner already described in connection with FIGS. 1 and 2, held together as a self-sustaining unit by the bindings 156 and mounted on shaft 128 with only the thin insulative layer 159 between. That structure provides virtually direct heat conduction from the copper bars of the commutator to the highly heat conductive body of shaft 128. Brushes 148 and brush holders 149 are typically conventional.

In accordance with the present invention, shaft 128 comprises the body 160, formed of metal having high heat conductivity, extending the entire axial length of the rotor and commutator and terminating in the heat absorbing structure 166. In the present embodiment, that heat absorbing structure comprises a mass of metal, preferably formed integrally with shaft body 160, and acting as a heat sink. Heat sink 166 is large enough to absorb readily the heat conducted to it during a single cycle of motor operation, which is typically of the order of a few minutes. The transverse cross-section of shaft body 160 is typically designed with attention to the amount of heat to be conducted axially at each portion of its axial length. Thus, at rotor 140 the shaft body diameter is relatively small, and is further reduced at the extreme left end of the motor, as seen in FIG. 3, where the steel stub shaft 167 is inserted to carry the bearing 124 and to provide a coupling fixture 168 for driving an external machine. At commutator 150 which is typically a major source of heat, the shaft body is considerably enlarged in diameter, and that full cross-section continues to the junction with heat sink 166, providing an ample path for heat conduction with minimum temperature drop.

In the present embodiment heat sink 166 is enclosed within housing 120, permitting the housing to be completely closed at that end of the shaft axis. Alternatively, such a heat sink structure may be mounted outside the main motor housing, for example in such position as the fan 70 of FIG. 1. The latter arrangement is particularly desirable when successive cycles of operation will be spaced closely in time and it is desired to provide a fan or other means for removing heat from the heat sink structure between cycles. In either case, provision of a heat sink capable of absorbing a large fraction of the heat developed by the motor during each cycle permits intermittent operation of a given motor structure at greatly increased rating.

For example, the rotor and commutator of a flameproofed direct current motor delivering 2½ horsepower during a duty cycle of 5 minutes can be effectively held to an acceptable temperature rise in accordance with the present aspect of the invention with a heat sink of aluminum weighing approximately ¾ lb., or roughly 10% of the total weight of the motor. The total weight of such a motor can be appreciably less than that of a conventional motor providing the same performance.

It is noted that the motor shown in FIG. 3 does not include a flame seal, such as seal 27 of FIG. 1, but that both the motor housing 20 of FIG. 1 and housing 120 of FIG. 3 form closed chambers that enclose the rotor assembly and the stator winding and that are without air circulation between the interior and exterior of the housings.

Whereas the invention is particularly useful in dynamoelectric machines having a commutator, and in combination with the described type of commutator structure, many aspects of the invention are also highly useful for removing heat developed by the rotor assembly in dynamoelectric machines having no commutator, such as alternating current machines, for example.

I claim:

1. A dynamoelectric machine comprising a housing, a stator assembly including a stator winding and mounted in the housing, and a rotor assembly in the housing mounted on a rotor shaft for rotation with respect to the stator assembly for cooperating electrodynamically therewith, the housing forming a closed chamber that is without air circulation between its interior and exterior and that encloses the rotor assembly and the stator winding; said machine being characterized by the fact that
    said rotor shaft includes a substantially continuous shaft body of metal having high thermal conductivity, said body occupying a predominant portion of the cross-section of the shaft throughout an axial length thereof that includes substantially the entire axial length of the rotor assembly and extends axially therefrom,
    and structure mounted in close thermal contact with said extending portion of the shaft body for removing heat by conduction from the shaft body.

2. A dynamoelectric machine as defined in claim 1, and in which said shaft body consists essentially of a metal selected from the group consisting of aluminum and copper.

3. A dynamoelectric machine as defined in claim 1, and in which said extending portion of the shaft body projects axially outward of said housing,
    and said heat removing structure comprises a fan having a hub mounted in heat conductive relation with the shaft body outside the housing and having blades mounted essentially integrally on the hub, said blades and hub being formed of metal having high heat conductivity.

4. A dynamoelectric machine as defined in claim 3, and in which said shaft body and fan consist essentially of metal selected from the group consisting of aluminum and copper,
    said fan hub being mounted directly on said projecting portion of the shaft body.

5. A dynamoelectric machine as defined in claim 3, and including also structure forming a path for axial airflow to the fan blades and for axial airflow from the fan blades over at least a portion of the exterior of said housing.

6. A dynamoelectric machine as defined in claim 1, and in which said machine has a normal cycle of operation of the order of a few minutes,
    and said heat removing structure comprises a mass of metal having high heat conductivity mounted in heat conductive relation with said extending portion of the shaft body and having a heat capacity sufficient to absorb a major portion of the heat developed by said rotor assembly during a normal cycle of said machine.

7. A dynamoelectric machine as defined in claim 6, and in which said heat absorbing mass is contained within said housing.

8. A dynamoelectric machine as defined in claim 1, and including also
    a commutator comprising a plurality of unitary commutator bars of metal having high heat conductivity, the radially outer faces of the bars forming the commutator working surfaces and the radially inner faces of the bars forming a cylindrical mounting surface for the commutator,
    the commutator being mounted on the rotor shaft within the housing with said mounting surface separated from the surface of the rotor shaft only by a thin annular layer of insulating material.

9. A dynamoelectric machine comprising in combination
    a housing having a generally cylindrical portion and axially spaced end portions,
    a rotor shaft journaled on bearings mounted on the respective end portions of the housing,
    a stator assembly including a winding and mounted in the housing coaxially of the shaft,
    a rotor assembly mounted on the shaft within the housing for cooperating electrodynamically with the stator assembly,
    a commutator mounted on the rotor shaft within the housing and adjacent the rotor assembly and comprising a plurality of unitary, angularly spaced commutator bars each of which extends radially from the commutator working surface to a radially inner cylindrical mounting surface, thin layers of insulating material between adjacent bars, a plurality of axially spaced coaxial bindings of glass roving impregnated with polymerized synthetic resinous material surrounding the bars and the insulating layers and binding the same together into an essentially rigid unit, and a thin annulus of insulating material between the commutator mounting surface and the shaft, flame restricting sealing formations between the housing ends and the shaft whereby the housing forms a flame-proof enclosure for the stator winding, said rotor shaft including a body of metal having high-heat conductivity occupying a predominant portion of the cross-section of the shaft throughout an axial length thereof that includes substantially the entire axial length of the rotor assembly and commutator and that extends axially outward of the housing, a fan having a hub mounted in heat conductive relation with the shaft at said extending portion of the shaft body and having blades mounted on the hub in thermal contact therewith, and structure forming a path for airflow to the fan blades and therefrom over at least a portion of the exterior of the housing.

10. A dynamoelectric machine as defined in claim 9, and in which said body of the rotor shaft and said fan consist essentially of metal selected from the group consisting of aluminum and copper.

11. A dynamoelectric machine comprising in combination a stator assembly including a winding, a rotor shaft journaled coaxially of the stator assembly, a rotor assembly mounted on the shaft for cooperating electrodynamically with the stator assembly and including a rotor winding, a commutator unit comprising a plurality of unitary, angularly spaced, mutually insulated commutator bars connected to the rotor winding, the radially outer faces of the bars forming the commutator working surface and the radially inner faces of the bars forming a cylindrical mounting surface, a plurality of axially spaced coaxial bindings of glass roving impregnated with polymerized synthetic resinous material surrounding the bars and binding the same together into an essentially rigid unit, the commutator unit being mounted on the rotor shaft with a thin annulus of insulaing material interposed between the shaft and said cylindrical mounting surface and forming substantially the only barrier to free heat flow between the commutator bars and the shaft, means supplying electrical current to the commutator working surface, and means within the rotor shaft for removing heat conducted to the shaft from the commutator bars.

References Cited

UNITED STATES PATENTS

| 2,360,303 | 10/1944 | Ingalls | 310—58 |
| 2,910,600 | 10/1959 | Young | 310—64 |
| 3,250,929 | 5/1966 | Maier | 310—64 |
| 3,271,601 | 9/1966 | Raver | 310—58 |

MILTON O. HIRSHFIELD, *Primary Examiner.*

R. SKUDY, *Assistant Examiner.*

U.S. Cl. X.R.

310—64